United States Patent
De Spiegeleer (10) Patent No.: US 7,254,596 B2
(45) Date of Patent: Aug. 7, 2007

(54) EFFICIENT COMPUTER FILE BACKUP SYSTEM AND METHOD

(75) Inventor: Kristof De Spiegeleer, Knouke (BE)

(73) Assignee: DataCenterTechnologies N.V., Cupertino, CA (US)

(*) Notice: Subject to any disclaimer, the term of this patent is extended or adjusted under 35 U.S.C. 154(b) by 472 days.

(21) Appl. No.: 10/780,683

(22) Filed: Feb. 19, 2004

(65) Prior Publication Data

US 2004/0236803 A1    Nov. 25, 2004

Related U.S. Application Data

(63) Continuation of application No. PCT/EP02/02588, filed on Mar. 8, 2002.

(30) Foreign Application Priority Data

Aug. 20, 2001  (EP)  .................. 01120041

(51) Int. Cl.
    G06F 12/00    (2006.01)
    G06F 17/30    (2006.01)
(52) U.S. Cl. .................. 707/204; 707/202; 707/203
(58) Field of Classification Search ......... 707/202–204
    See application file for complete search history.

(56) References Cited

U.S. PATENT DOCUMENTS

| | | | |
|---|---|---|---|
| 5,301,286 A | 4/1994 | Rajani | |
| 5,649,196 A | 7/1997 | Woodhill et al. | |
| 6,513,051 B1 * | 1/2003 | Bolosky et al. | 707/204 |
| 6,526,418 B1 * | 2/2003 | Midgley et al. | 707/204 |
| 6,971,018 B1 * | 11/2005 | Witt et al. | 713/187 |
| 2002/0107877 A1 * | 8/2002 | Whiting et al. | 707/204 |

FOREIGN PATENT DOCUMENTS

| | | |
|---|---|---|
| EP | 0 774 715 | 5/1997 |
| EP | 0 899 662 | 3/1999 |
| WO | WO 99/09480 | 2/1999 |

* cited by examiner

Primary Examiner—Apu Mofiz
Assistant Examiner—Cindy Nguyen
(74) Attorney, Agent, or Firm—Meyertons Hood Kivlin Kowert & Goetzel, P.C.; B. Noël Kivlin (57) ABSTRACT

A system and method for efficiently backing up and restoring computer files to a central storage system. A hashing key is computed for each file to be backed up on a target computer. The hashing key is compared to a list of hashing keys stored locally to see if the local file has been previously backed up. If the hashing key is not listed locally, then the hashing key is compared to a list of hashing keys of centrally backed up files. Only if the hashing key is not present in both the local and the central list is the file backed up. Backed up files may be renamed to their hashing key for further efficiencies.

23 Claims, 4 Drawing Sheets

EFFICIENT COMPUTER FILE BACKUP SYSTEM AND METHOD

This application is a continuation of PCT/EP2002/02588 (WO03/019412) filed on Mar. 8, 2002, and claims priority to European patent application EP01120041.7 filed Aug. 20, 2001.

BACKGROUND OF THE INVENTION

The present invention relates generally to a method for backing up and restoring data files and programs on a computer system, and more particularly, the invention relates to an efficient method for determining whether a file or program has been previously backed up, or if a backed up copy of that file exists, and then only backing up those programs that have not been previously backed up and which have no backed up copies. Thus, the system and method allows for efficient use of bandwidth to locally, or remotely, back up files of a computer and/or computer system.

Conventional approaches for backing up computer programs and data files often utilize large amounts of expensive network bandwidth and excessive amounts of processor (CPU) processing time. Currently, many backup processes back up the entire program and data repository of a computer or computer system, leading to duplication of backed up files and programs, and requiring large amounts of network bandwidth and excessive amounts of storage media (such as tapes or compact discs (CDs)).

The networks of many organizations often comprise data centers ("server farms") to store and manage great amount of Internet accessible data. Data centers often include several computer systems, such as Internet servers, employee workstations, file servers, and the like. Often, such data centers have scalability problems using traditional backup systems. The required bandwidth and storage is not sufficient to do massive backup of data center environments. A system that is scalable and can grow with an organization would be beneficial.

Some savings of bandwidth and storage media can be achieved by incremental backup methods, which only back up those files that have been changed or updated. However, these methods do not solve the problem that duplicate files residing on different computers on a network, or even different networks, still often get backed up in a duplicate fashion, eating up extensive amounts of storage media.

For example, data files are often shared among many persons, and duplicate copies reside on many different computers, leading to many multiples of copies of files across one, or many, computer networks. Further, computers often use duplicate program and data files for running operating systems and applications. In a network running Microsoft Windows®, for example, each computer may have duplicate operating system files and programs. Backing up the entire network using conventional means may result in many multiples of copies of those files and programs, leading to an extensive waste in storage media. A means of eliminating duplication of backed up files and programs would be desirable, with the possible benefits resulting in more efficient use of storage media, processing time, and network bandwidth.

Further, conventional backup methods implemented by organizations often use a multiplicity of computer servers to perform the backups, often back up to tape media, leading to distributed storage of data backups, again leading to duplication and waste in both media and processor time.

Further still, a distributed backup process typically leads to the need to store many backup tapes, or other similar backup media, and requires a method of tracking the multiple media. Such a system is often very difficult to restore, especially if incremental backup processes are used. The proper storage media must be located and loaded in the proper sequence. Tape restoration is a lengthy, time consuming process. Often, it is so inefficient and error prone that the restore process is ineffective, resulting in a loss of data and even a loss of productivity, as programs must be re-installed and data rebuilt. A more efficient, easier to use backup system leading to more effective and more easily implemented restore procedure would be beneficial to organizations using computer systems.

SUMMARY OF THE INVENTION

The invention relates to an improvement in backup technology, and more particularly, creates a solution for massive server backup in Internet data center and enterprise data center environments, resulting into a solution for disaster recovery and data protection.

The invention is an improved System and a Method of using a hashing key of file content for more efficient and more effective computer file and computer program backups.

The first step in the process is to scan the file system on the target machine (computer system to be backed up) and creating a hashing key, creating a unique digital code for each of the files to be backed up. In a preferred embodiment, in order to reduce the processing time, a hashing key is only created for the files having a modification date attributed that is more recent than the last backup.

The resulting hashing keys are stored in a local database—a database on the target computer, for example—for further comparison during the current, and future, backup sessions. The local database also includes the complete path of each backed up file.

The stored hashing keys are checked against previous hashing key entries in the local database. In this way, the hashing keys are used to check each local file to determine if it was previously backed up on the target system. The hashing keys not found in the local database key list are used in the next step of the process.

The hashing keys that were not found in the local hashing key database are checked against the hashing keys of the files stored on a central storage server. This check is used to determine if a particular file is already present on the central storage server. The file may be present as the result of a backup from another server or system, or from prior backup operations.

The decision whether to back up is performed file by file, instead of block-by-block for example. This strongly reduces the number of comparisons and the size of the local database, and is very well adapted to farm servers in which not only data blocks, but often complete files, are duplicated in several servers.

DETAILED DESCRIPTION OF THE PREFERRED EMBODIMENTS

Traditionally, backup solutions greatly increase network traffic and can use enormous storage capacity, whether doing incremental or full backups of computers, servers, or systems. The invention uses content hashing keys to make intelligent decision to backup certain data or not, and utilises central storage capability to provide for more efficient and more effective backup storage and restoration activities.

The invention is a System and a Method of using a hashing key of file content for more efficient and more effective computer file and computer program backups. In this description, the terms "file", "program", "computer file", "computer program", "data file", and "data" are used interchangeably, and any one use may imply the other terms, according to the context used.

The invention utilizes a process of using a hashing mechanism to check to see if a file is unique in a backup system. Only unique and not yet backed up files will be stored on a central storage system, leading to efficiencies in the use of network bandwidth and storage media. The process makes use of matching newly created content keys against all previously generated hashing keys (using localized and/or centralized lists) to make a backup decision, resulting in a holistic approach of doing backup, and making the restore function more effective and less cumbersome. The resulting method has a minimal consumption of bandwidth and a minimal use of storage capacity by reducing duplication of both network traffic and backup file storage. This is especially useful for backing up operating system files and common application programs.

Figure 1:
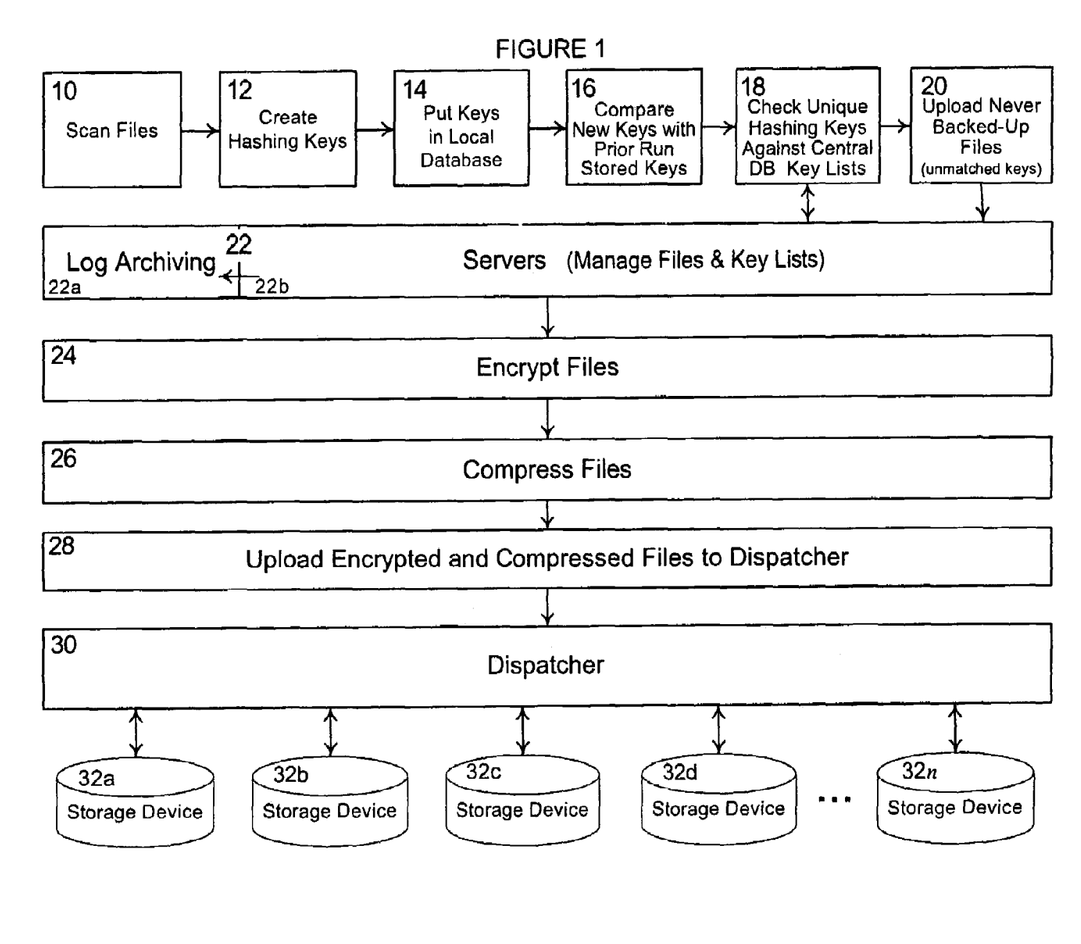
FIG. 1 is a block diagram showing the major steps of the backup process, according to an aspect of the invention.

FIG. 1 provides an overview of the method according to an implementation of the invention backup process. The first step in the process, shown by block 10, is to scan the file system on the target computer/system (individual computer or computer system to be backed up) and create a content hashing key—in either 32 or 64 byte modes, for example—as represented by block 12. The hashing key is a unique digital code for each of the files to be backed up. The hashing key is unique for each unique file. Further, the hashing key is identical for identical copies of files. In this way, the hashing key becomes a unique identifier for the file and any identical duplicates. Accordingly, if two files have the same hashing code, they are identical, and can, and will, be treated as such. An industry hashing process such as MD5 could be utilized.

The resulting hashing keys are stored in a local database 404 (FIG. 3) for further comparison during the current, and future, backup sessions. This is represented by block 14 of FIG. 1. Along with the hashing keys is stored the path and/or file name for the file corresponding to the hashing key.

An improvement over this process would be to append the hashing key to the computer file itself. In this way, files that have already undergone hashing processing can be bypassed from the hashing process, providing further savings in computer processing. However, not all files can be so appended, so this improvement may not be feasible for all computer file types.

The stored hashing keys are checked against previous hashing key entries in the local database 404, as represented by block 16 in FIG. 1. In this way, the hashing keys are used to check if each local file was ever backed up before on the target system. The hashing keys not found in the local database are used in the next step of the process. This allows efficient use of computer resources, because only those files that are not recorded as having been recently backed up, or at least recently processed, are subject to further processing.

The hashing keys that were not found in the local hashing key database are now checked against the files stored in a central database 408, as represented in block 18 of FIG. 1. Along with the hashing keys stored in the local database are stored the path and/or file name for the files corresponding to each hashing key. The hashing keys are used to determine if the corresponding file is already present on the central storage server 400, and thus will not need to be backed up. The file may be present as the result of a backup from a different target computer 300 or even a different target network. The principle is to store a single copy of each unique file within the central storage system, no matter how many different target computers might contain that same, identical file.

If there is no match for a given hashing key in the central database, that hashing key is added to the central database 408, and the corresponding file is uploaded (block 20 of FIG. 1) to the central storage system 400 (block 22), which manages the files and the hashing key lists. A record of the process can be kept by the servers (see log archiving block 22a). The files to be archived are encrypted for security reasons, if desired (block 24) and the file is compressed to reduce the storage media requirements (block 28). An encryption key might be generated by using the hashing key, and transforming it through a known, but secure, algorithm, for example.

Finally, a dispatching process is then performed (block 30 of FIG. 1). Based on the hashing key, the dispatching process will decide to which location the file needs to be dispatched, and which storage device (32a, 32b, 32c, 32d . . . 32n) it should be stored on. The storage devices are likely to be centrally located to increase efficiencies, but the invention could use distributed, or even remotely located devices as well. The hashing keys could be used for dispatching files to different locations in the storage network.

In a preferred embodiment, the stored files are renamed using the hashing key as the file name. This would make retrieval of the file simple and faster. When restored, the original file name would be restored by cross-referencing the hashing key to the file name and/or file path on the machine to be restored.

Figure 2:
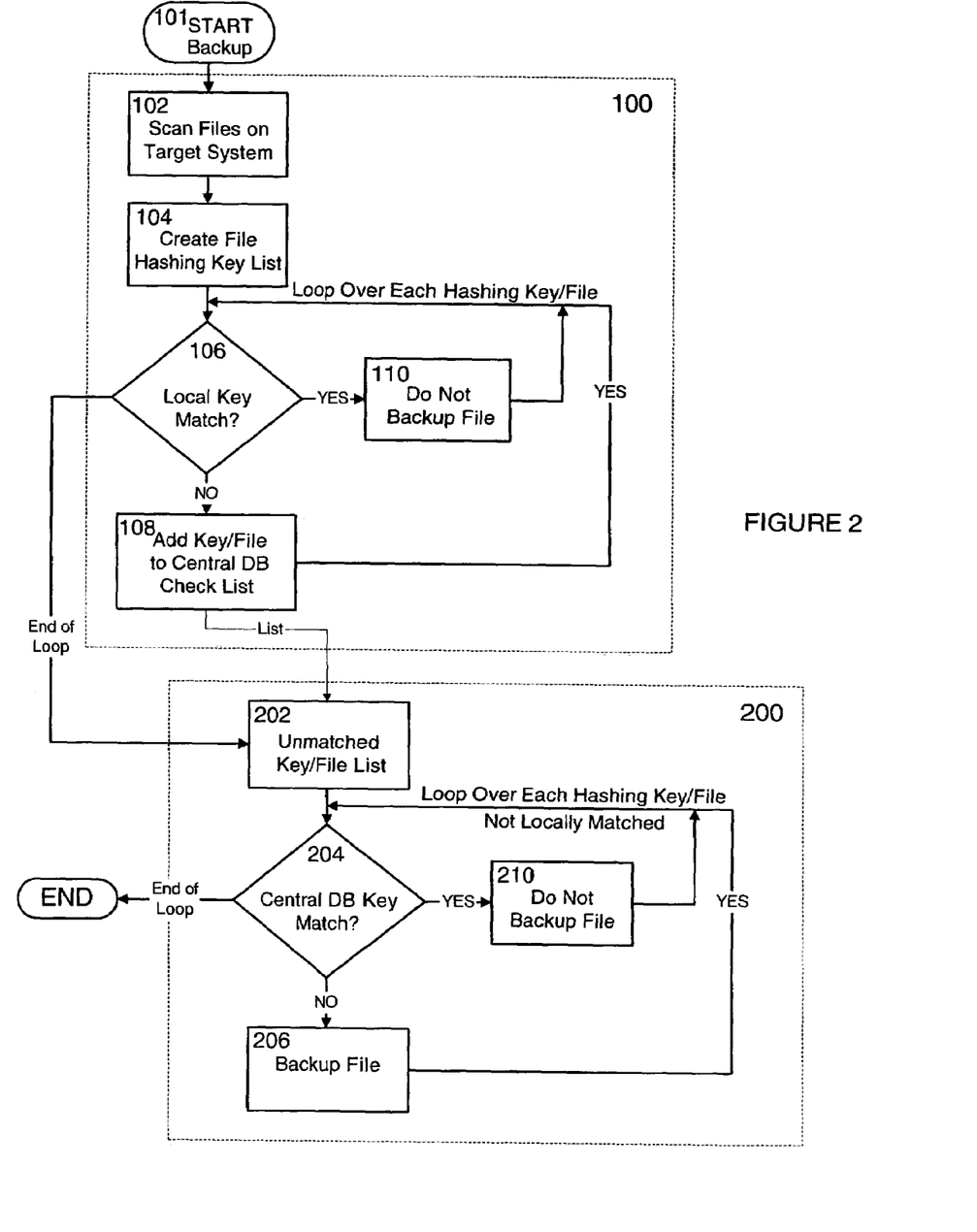
FIG. 2 is a block diagram showing the backup decision making process according to an aspect of the invention.

The flow chart of FIG. 2 shows the file backup decision making process in more detail. Local scanning is shown by the steps in block 100. Files are scanned in step 102, and the hashing keys are formed by step 104. In a preferred embodiment, a hashing key is only computed for the files having a modification or creation date attributed that is more recent than the last backup date. Each hashing key is compared to a locally stored list of hashing keys in the local database 404. The local database 404 contains, for each file which has been previously backed up, a record including the hashing key and the complete path and name of the file (step 106). Those files that have a match are not to be backed up (step 110), while those files that have a hashing key that does not match the local list (step 106) need further processing (steps in block 200). At least for each non-matched file, a new record is stored in the local database including the hashing key and the complete path and name of the file. The hashing keys for the non-matched files are collected for forwarding (step 108), and are forwarded to be compared to a list of keys stored centrally (central database 408) (step 202). If the keys do match previously centrally stored hashing keys (step 204) the files are not backed up (step 210). However, only if there is no match (step 204), the file is backed up. The hashing key will be stored in the central database 408, and the files may undergo the processing described above (i.e., encryption and compression) before being backed up or archived in storage.

A further improvement over the above process can be implemented by keeping historical copies of files, and historical copies of hashing lists 404, 408, so that any individual machine can be restored to its file system state for some given point in time past. Obviously, implementing this improvement requires additional storage media in the central storage system 400 in order to keep these "snapshots" in time available. The only limit to how far back one can archive files systems is the amount of storage to be dedicated to the task. Accordingly, one can save capital costs by not implementing this feature of the invention, if historical snapshots of computer file systems are not desirable for a particular implementation.

Restoring files according to the system is basically performed by reversing the process. Because each target computer 300 or system has a local database 404 including the records of the hashing keys of processed files, those hashing keys on the local database can be used to identify the files that need to be restored on the target computer 300 to the path indicated in the record. Backup copies of the local databases should also be stored on different machines, or even backed up centrally, so that the list of hashing keys and corresponding paths is available for rebuilding the file system of a damaged machine.

The system restores the damaged machine's file system by restoring each file listed on the local machine's database 404 with the files stored in the central storage system 400 corresponding to their hashing keys. Further, it would be possible to store the local database 404 itself in the central storage system 400 in order to preserve the computer file system status record, or to back up this local database in the central storage system 400.

Similarly, restoring a computer system to some prior historical file system state, should this feature be implemented, merely requires obtaining the local database for that point in time, and then restoring the file system files according to that historical local database. The historical local databases could be stored locally, centrally, or, preferably, in both locations.

The hashing code itself could be used to ensure file integrity during the backup and restore processes. By running the hashing process on the backed up and/or restored files, a hashing code is generated which can be compared to the original hashing code. If the keys are not identical, a file error has resulted, and file integrity cannot be assured. If identical, file integrity is assured.

Figure 3:
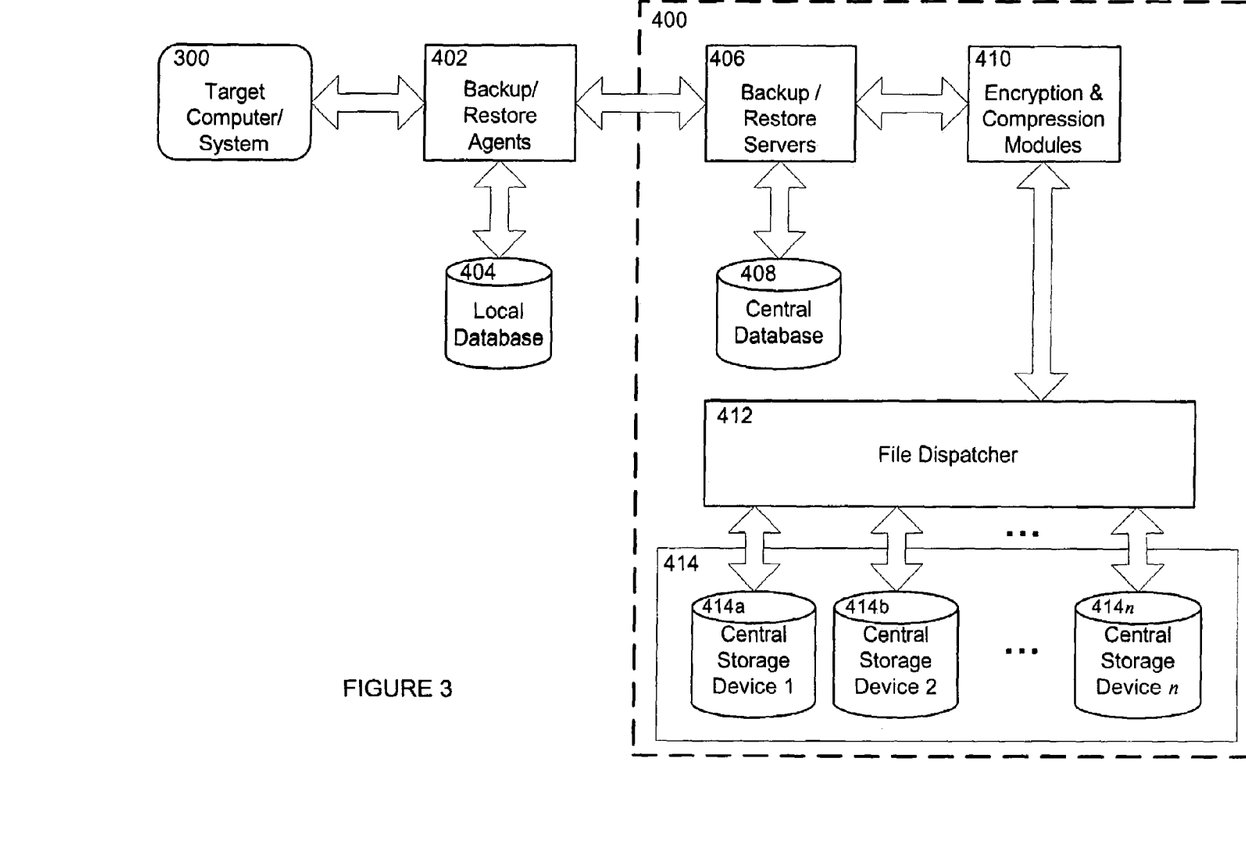
FIG. 3 is a block diagram showing one implementation of a system according to the invention for implementing the method of the invention.

FIG. 3 shows a possible high-level overview of an implementation of a system to practice the method according to the invention. The target computer or target system 300 is the system to be backed up. A backup agent 402 can be run, perhaps on the target system, or on a server to which the target system is a client. Further, the backup agent could be run remotely. The backup agent 402 implements the file scanning and hashing functions discussed hereinabove. The backup agent 402 also uses the local database 404 including a record for each file which has been previously backed up and implements the local comparison operations (block 100 of FIG. 2), to determine if the files on the target 300 have been previously backed up.

For greater efficiencies, or to avoid drains on target computers, the backup agent 402 could be run on a dedicated server, optimized for this function. The backup agent 402 may include a restore function as well, or a separate module could implement the restore function. The backup agent 402 and/or the restore agents could utilize a World Wide Web (web) interface to allow remote management of file backup of the target system over a wide area network (WAN) such as the internet, or locally via a local area network (LAN) or other network. Alternatively, or concurrently, the backup servers 406, discussed hereinbelow, might also be managed via the same, or similar, web interface. This could allow the backup and/or restore operations to be controlled remotely, wherever access to the agent 402, and/or the servers 406, can be provided.

A central storage system 400 is utilized to implement the centralized backup functions, including the centralized comparison operations of block 200 in FIG. 2. Although described as a centralized system, it will be understood that the functions and/or components described for this centralized system could be distributed or located remotely, depending on the desired implementation of the invention.

Backup and Restore servers 406 are used to direct the centralized backup operation. The servers 406 receive the list of hashing keys that represent files that are not listed on the local key lists from the agents 402. The servers 406 then compare the unmatched key list(s) to key lists (of previously backed up files) stored on a central hashing key database 408. It will be understood that this database could, if desired, be stored into one or more of the storage devices 414 discussed hereinbelow. If the file is not currently backed up in the central devices 414, there will be no match to the hashing keys contained in the central key database 408. This means that the corresponding file needs to be backed up. In that case, the servers 406 obtain the corresponding files from the agent 402, or alternatively the servers might obtain the files themselves, and rename it to its hashing key, forward that renamed file to the encryption and compression modules 410 (if encryption and/or compression are desired), which implement the encryption and compression steps described above. It will be understood that the encryption and/or compression module could be operated on the servers 406, if desired, or by separate computers/servers.

The encrypted and compressed files are then forwarded to a file dispatcher 412, which directs the file to an appropriate storage device 414a, 414b . . . 414n, based on the hashing key, or some other indicator as to where the file should be stored. These databases 414n may be centrally located, or distributed, as desired.

To restore a unique file, the target server 300 requests the hashing key for that file from the local database (on the target server) and retrieves the file with that name from the central storage server 406.

It is possible that the centralized backup system 400 is located remotely from the target system 300, or locally. The backup system 400 may be remotely provided by a service provider using an ASP or XSP business model, wherein the central system is provided to a paying client operating the target system 300. Such a system could utilize a public WAN, such as the Internet, to provide network connectivity between the central system and the target client. Alternatively, a private network (WAN or LAN, etc.) could connect the two systems. A virtual private network (VPN) over a public network could also be utilized. Further, the client may wish to implement such a system locally to ensure local control and autonomy, especially in cases where the information to be stored may be especially sensitive, valuable, and/or proprietary. However, where such concerns aren't a priority, a more cost-effective service could be marketed where the central system is provided by a service provider. In this case, Internet connectivity could be economical, and a web-based management system, as described above, would also be useful, and is easily accommodated according to the invention.

Systems utilizing the invention could be implemented using a self-service model, allowing client network administrators to back up and restore the client systems. In this case, the network administrators would access the service via an interface such as the web-based implementation discussed above. Alternatively, centralized administration could be implemented to offload the backup duties from the client. Such systems would be useful for IDC server farms, and for integrating with DataCenterTechnologies' Operating Systems. Further the system could utilize open standards such as XML/SOAP, HTTP, and FTP, among many others.

Figure 4:
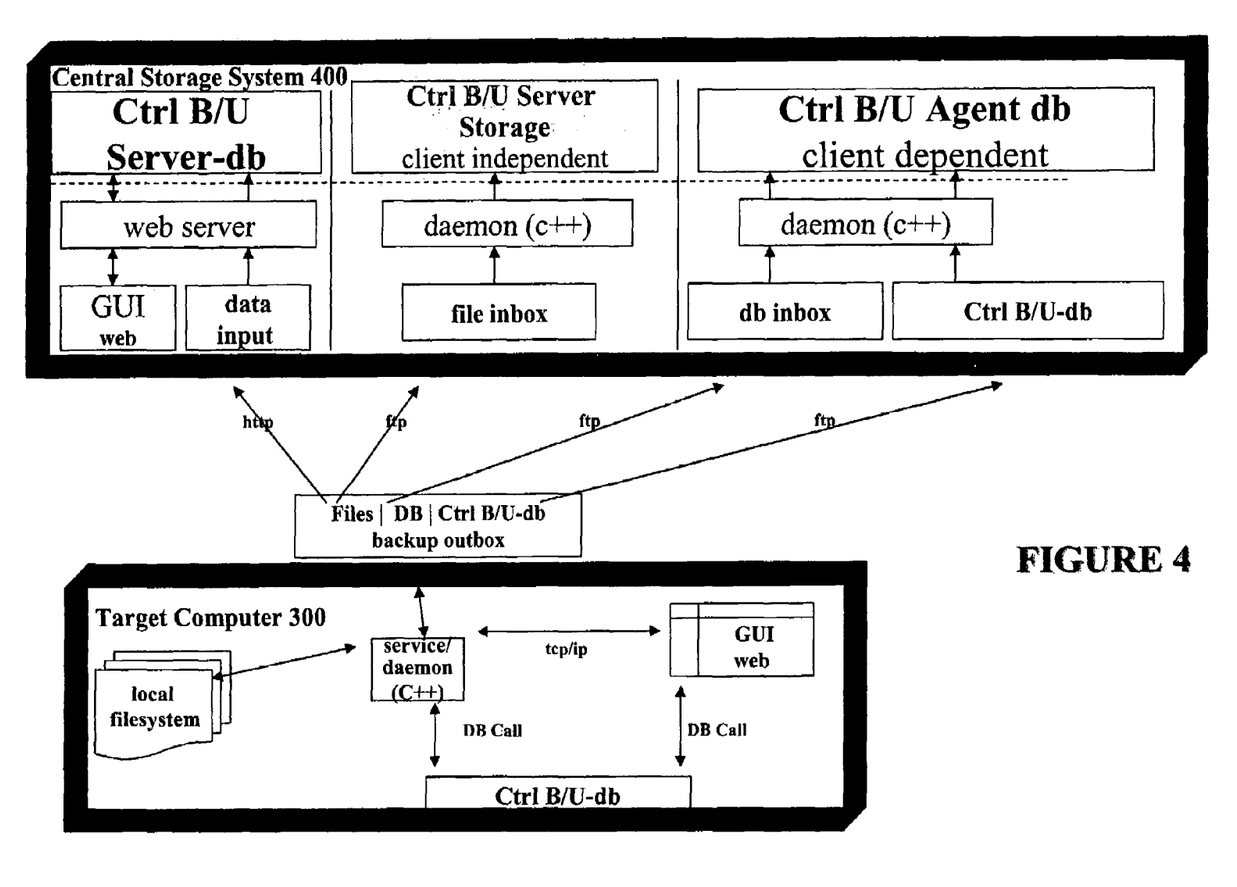
FIG. 4 is a block diagram showing a more detailed implemenation of the Backup subsystem of the invention.

FIG. 4 shows a more detailed potential implementation of a backup sub-system of the system overview given in FIG. 3, showing various components of the client and system servers. This figure corresponds to a more detailed description (given hereinbelow) of one potential implementation of the method of the invention.

According to a more detailed possible implementation of the system, a user would access a GUI to configure a backup job with an attached schedule. This backup job would contain a selection of files/directories to backup, OS specific backup options, and a scheduling option. When a backup is executed manually or caused by the schedule:

I) a file system scan results in the files currently available on the target server 300 and that will be stored in the local database 404 as a 'current_backup' table. For each file in this table, the location of the file, the attributes and the last modification time are stored.

II) Next, the table 'current_backup' is compared against the table 'previous_backup' in the database 404, where the previous backup history is stored. The result of the comparison would be the files where the last modification time has been changed.

III) A content checksum of the changed files is generated and stored in the 'current_backup' table in the local database 404.

IV) These checksums are then checked against the global library of checksums, physically residing in the central database 408 on the central storage server 400. The result set of this check is the list of the missing checksums.

V) These missing checksums stand for the files that need to be transferred to the central storage server 400. Each file with a missing checksum will have a backup procedure, which includes data synchronization to the storage server, physically transfer of its content, compression, encryption and integrity checks during the different phases, to guarantee the successful receipt of the file.

VI) When the file has been successfully backed up, the file will be marked as successfully backed up in the local database 404.

VII) After the backup process, data synchronization between the client and the storage server 400 results in a central backup history for all target servers (clients).

The restore process can be performed in several ways, based on the different locations where the backup history is stored. By default, a restore is performed out of the history stored in the local database 404. A subset of a previous backed up set of files is selected by the operator. This list contains for each file: the original location, the content key and the file attributes. Based on this information, the agent can get the file out of the library, decompress and decrypt the content, and restore the file to its original location, followed by restoring the attributes on the restored file.

A second way of restoring files is to get the backup history out of a snapshot file. This is a plain text file, created during the backup process and containing a list of files. Next to each file's original location during backup, the content key and the file attributes are stored. When we provide such a file to the agent on the client computer, the agent can restore these files, based on the description mentioned above.

A snapshot file could also be created out of the backup history stored in the central database 408, residing on the central storage server 400.

The invention claimed is:

1. A method for deciding whether a specific file on a target computer should be backed up to a central storage system, said method comprising the steps of:
   computing a specific hashing key from the content of said specific file;
   verifying if said specific hashing key is already present in a local database, wherein, for each computer file on said target computer which has been previously backed up, said local database comprises a record including:
      a file hashing key computed from said computer file; and
      a local file path in said target computer where said computer file should be restored, said file path being associated with said file hashing key;
   if said specific hashing key is not present in said local database, backing up said specific file by performing the steps of:
      creating a backup file which is a duplicate of said specific file;
      renaming said backup file to said specific hashing key;
      storing said renamed backup file in said central storage system; and
      storing in said local database a new record including said specific hashing key and a specific path in said target computer where said specific file should be restored; and
   if said specific hashing key is present in said local database not backing up said specific file in said central storage system.

2. The method according to claim 1, further comprising the steps of:
   verifying if said specific hashing key is already present in at least one central database of file hashing keys derived from computer files already backed up in said central storage system; and
   backing up said specific file if and only if said specific hashing key is not present in said at least one central database of said central storage system.

3. The method according to claim 2, wherein said target computer is connected to a LAN and further wherein said central storage system is connected to said LAN by a WAN.

4. The method according to claim 1, wherein a plurality of target computers are connected with said central storage system, and further wherein said specific file is not backed up if it is already present in said central storage system as the result of a backup from any target computer.

5. The method according to claim 4, wherein the location of said renamed backup file in said central storage system depends on said specific hashing key.

6. The method according to claim 5, wherein said central storage system comprises a plurality of storage devices.

7. A method for restoring a specific file to a target computer, said method comprising the steps of:
- requesting a specific hashing key corresponding to said specific file from a local database storing a previously computed hashing key for each backed up computer file;
- requesting a specific path location associated with said specific hashing key from said local database;
- using said specific hashing key to retrieve a backup file from a central storage server, said backup file being a duplicate of said specific file, wherein a name under which said backup file has been stored in said central storage server depends on said hashing key; and
- saving said backup file to said specific path location on said target computer.

8. The method according to claim 7, wherein the location at which said backup file has been stored in said central storage server depends on said hashing key.

9. A central storage system for backing up a specific file on a target computer comprising:
- means for computing a specific hashing key from the content of said specific file;
- means for verifying if said specific hashing key is already present in a local database, wherein, for each computer file on said target computer which has been previously backed up, said local database comprises a record including:
  - a file hashing key computed from said computer file; and
  - a local file path in said target computer where said computer file should be restored, said file path being associated with said file hashing key;
- means for backing up said specific file if said specific hashing key is not present in said local database, said backing up comprising the steps of:
  - creating a backup file which is a duplicate of said specific file;
  - renaming said backup file to said specific hashing key;
  - storing said renamed backup file in said central storage system; and
  - storing in said local database a new record including said specific hashing key and a specific path in said target server where said specific file should be restored;
- wherein, if said specific hashing key is present in said local database, said specific file is not backed up.

10. The central storage system according to claim 9 being a central storage system, and further comprising means for verifying if said specific hashing key is already present in at least one central database of said central storage system, said central database including file hashing keys derived from computer files already backed up in said central storage system, wherein said means for backing up is performed only if said specific hashing key is not present in said at least one central database.

11. The central storage system according to claim 10, wherein said target computer is connected to a LAN and further wherein said central storage system is connected to said LAN by a WAN.

12. The central storage system according to claim 9, wherein a plurality of target computers are connected with said central storage system, and further wherein said specific file is not backed up if it is already present in said central storage system as the result of a backup from any target computer.

13. The central storage system according to claim 12, wherein the location of said renamed backup file in said central storage system depends on said specific hashing key.

14. The central storage system according to claim 9, further comprising:
- means for restoring said specific file from said central storage system to said target computer, comprising:
- means for requesting said specific hashing key corresponding to said specific file from said central database;
- means for requesting said specific path location associated with said specific hashing key from one of said local databases and said central database;
- means for using said specific hashing key to retrieve said backup file from said system; and
- means for saving said backup file on said target computer to said specific path location.

15. The central storage system of claim 14, wherein, during said backing up, if said specific hashing key is not present in said local database, said backup file is renamed to said specific hashing key before storing said backup file in said central storage system, and further wherein, during said restoring, said backup file is renamed to the name of said specific file before saving said backup file to said target computer.

16. A computer program product stored on a computer-usable medium comprising computer-readable program means for causing said computer to perform a method for deciding whether a specific file on a target computer should be backed up to a central storage system, said method comprising the steps of:
- computing a specific hashing key from the content of said specific file;
- verifying if said specific hashing key is already present in a local database, wherein, for each computer file on said target computer which has been previously backed up, said local database comprises a record including:
  - a file hashing key computed from said computer file; and
  - a local file path in said target computer where said computer file should be restored, said file path being associated with said file hashing key;
- if said specific hashing key is not present in said local database, backing up said specific file by performing the steps of:
  - creating a backup file which is a duplicate of said specific file;
  - renaming said backup file to said specific hashing key;
  - storing said renamed backup file in said central storage system; and
  - storing in said local database a new record including said specific hashing key and a specific path in said target computer where said specific file should be restored; and
- if said specific hashing key is present in said local database not backing up said specific file in said central storage system.

17. The computer program product as recited in claim 16, wherein the method performed by the computer further comprises:
- verifying if said specific hashing key is already present in at least one central database of file hashing keys derived from computer files already backed up in said central storage system; and
- backing up said specific file if and only if said specific hashing key is not present in said at least one central database of said central storage system.

18. The computer program product as recited in claim 17, wherein said target computer is connected to a LAN and further wherein said central storage system is connected to said LAN by a WAN.

19. The computer program product as recited in claim 16, wherein a plurality of target computers are connected with said central storage system, and further wherein said specific file is not backed up if it is already present in said central storage system as the result of a backup from any target computer.

20. The computer program product as recited in claim 19, wherein the location of said renamed backup file in said central storage system depends on said specific hashing key.

21. The computer program product as recited in claim 20, wherein said central storage system comprises a plurality of storage devices.

22. A computer program product stored on a computer-usable medium comprising computer-readable program means for performing a method for restoring a specific file to a target computer, said method comprising the steps of:

requesting a specific hashing key corresponding to said specific file from a local database storing a previously computed hashing key for each backed up computer file;

requesting a specific path location associated with said specific hashing key from said local database;

using said specific hashing key to retrieve a backup file from a central storage server, said backup file being a duplicate of said specific file, wherein a name under which said backup file has been stored in said central storage server depends on said hashing key; and saving said backup file to said specific path location on said target computer.

23. The computer program product as recited in claim 22, wherein the location at which said backup file has been stored in said central storage server depends on said hashing key.

* * * * *